United States Patent [19]

Kosha et al.

[11] Patent Number: 4,917,947
[45] Date of Patent: Apr. 17, 1990

[54] MAGNETIC RECORDING MEDIUM

[75] Inventors: Kideaki Kosha; Kiyomi Ejiri; Toshihiko Miura; Koyotaka Fukino; Kouichi Masaki, all of Kanagawa, Japan

[73] Assignee: Fuji Photo Film Co., Ltd., Kanagawa, Japan

[21] Appl. No.: 125,277

[22] Filed: Nov. 25, 1987

[30] Foreign Application Priority Data

Nov. 28, 1986 [JP] Japan ................................ 61-281866
Nov. 28, 1986 [JP] Japan ................................ 61-281867
May 13, 1987 [JP] Japan ................................ 62-114404

[51] Int. Cl.$^4$ ......................... G11B 5/70; G11B 5/708
[52] U.S. Cl. .................................... 428/329; 428/403; 428/694; 428/900
[58] Field of Search ................ 428/403, 694, 900, 329

[56] References Cited

U.S. PATENT DOCUMENTS

| | | | |
|---|---|---|---|
| 4,578,314 | 3/1986 | Ohta et al. | 428/403 |
| 4,634,627 | 1/1987 | Fujiki et al. | 428/694 |
| 4,687,703 | 8/1987 | Miyoshi et al. | 428/694 |
| 4,710,424 | 12/1987 | Bandara et al. | 428/900 |
| 4,743,500 | 5/1988 | Miyoshi et al. | 428/694 |

Primary Examiner—Paul J. Thibodeau
Attorney, Agent, or Firm—Sughrue, Mion, Zinn, Macpeak & Seas

[57] ABSTRACT

A magnetic recording medium is described, comprising a non-magnetic support having provided thereon a magnetic layer comprising a binder having dispersed therein a ferromagnetic powder, in which said magnetic layer contains surface-coated inorganic particles having a Mohs hardness of 5 or more as an abrasive, said coated inorganic particles being present in a larger proportion in the vicinity of the surface of the magnetic layer. The magnetic recording medium has improved electromagnetic characteristics and improved running durability.

10 Claims, No Drawings

MAGNETIC RECORDING MEDIUM

FIELD OF THE INVENTION

This invention relates to a magnetic recording medium comprising a non-magnetic support having provided thereon a magnetic layer containing, as main components, a ferromagnetic powder and a binder. More particularly, it relates to a magnetic recording medium which contains abrasive particles in the magnetic layer thereof to improve running durability and electromagnetic characteristics.

BACKGROUND OF THE INVENTION

Conventionally employed magnetic recording media, such as audio tapes or discs, video tapes or discs, computer data tapes, and the like, comprise a non-magnetic support having provided thereon a magnetic layer comprising a binder having dispersed therein a ferromagnetic powder, e.g., a powder of $\gamma\text{-}Fe_2O_3$, Co-doped iron oxide, chromium dioxide, ferromagnetic alloys, etc. With the recent demands for these magnetic recording media to have an increased recording density and an increased S/N ratio, there is a tendency to use finer particles of the magnetic substance. However, as the magnetic powder becomes finer, abrasion resistance of the powder is reduced, resulting in deterioration of running durability of the resulting magnetic recording media. This tendency is particularly conspicuous when in using ferromagnetic alloy fine powders having low hardness.

In order to prevent deterioration in running durability, it has been proposed to add a granular abrasive, such as $Al_2O_3$, SiC, $Cr_2O_3$, etc., to a magnetic layer. The abrasives to be used for this purpose include particles of hard substances, such as chromium oxide, fused alumina, silicon carbide, corundum, diamond, emery (consisting mainly of corundum and magnetite), siliceous substances, silicon nitride, boron nitride, tungsten carbide, titanium oxide, etc. These abrasives may be used either individually or in combinations of two or more thereof.

The inventors previously researched into various combinations of the above-described abrasives and, as a result, found that running durability and electromagnetic characteristics of a magnetic recording medium can be improved markedly by using a magnetic layer containing acicular $Cr_2O_3$ having a length in the long axis of not more than 1.0 $\mu$m, a length in the short axis of not more than 0.1 $\mu$m, and an acicular ratio of from 5 to 20 in combination with an inorganic powder of at least one member selected from $\alpha\text{-}Al_2O_3$, SiC, and TiC, a ratio of the acicular $Cr_2O_3$ to the inorganic powder being greater 2/8, and the total amount of said acicular $Cr_2O_3$ and inorganic powder ranging from 1 to 20% by weight based on a magnetic powder, as disclosed in Japanese Patent Application (OPI) No. 109227/87(the term "OPI" as used herein means a "published unexamined Japanese Patent Application).

Incorporation of a large quantity of the aforesaid abrasives aiming at improvement on running durability is attended by deterioration in magnetic orientation of the medium, filling degree or dispersibility of a magnetic powder, which would lead to reduction of electromagnetic characteristics due to deteriorated surface properties.

Surface properties of the magnetic layer may be improved by reduction of the used amount of the abrasive, and whereby the electromagnetic characteristics is improved. But the magnetic layer have a poor running properties due to causes such as an increased coefficient of friction, and an adhesion of tapes upon running.

The characteristics relating to a magnetic layer such as scractch resistance or running durability of a magnetic layer are varied depending on conditions between the surface of a magnetic layer and the surface of a magnetic head. Therefore, if an abrasive is incorporated into a magnetic layer for the purpose of improving various characteristics, it is only those abrasive particles exposed on the surface of the magnetic layer that make a contribution to such improvements, while those particles buried inside the magnetic layer produce no effects. From this viewpoint, the surface of the abrasive particles take an important role in magnetic recording media. However, the improvements attained by the conventional abrasives are so far confined within narrow ranges of known characteristics, and striking improvements have not been expected.

SUMMARY OF THE INVENTION

One object of this invention is to provide a magnetic recording medium having improved running durability and electromagnetic characteristics at the same time.

The inventors continued various investigations in order to solve the above problem and, as a result, it was further found that these improvements are attributed to localization of the coated particles in the surface portion of the magnetic layer, that is, when the magnetic layer is applied onto a support, the coated particles gather in the vicinity of the surface of the magnetic layer whereby the purposed improvements can be achieved.

The present invention relates to a magnetic recording medium comprising a non-magnetic support having provided thereon a magnetic layer comprising a binder having dispersed therein a ferromagnetic powder, in which said magnetic layer contains a surface-coated inorganic particle having a Mohs' hardness of 5 or more as an abrasive, said coated inorganic particle being present in a larger proportion in the vicinity of the surface of the magnetic layer.

DETAILED DESCRIPTION OF THE INVENTION

The inorganic particle to be used in the present particle is not particularly limited as long as it has a Mohs' hardness of 5 or more, and is usually selected from inorganic compounds including $\alpha\text{-}Al_2O_3$, $Cr_2O_3$ (Mohs' hardness: 9), TiC, SiC, $SnO_2$, $TiO_2$, $ZrO_2$, $\alpha\text{-}Fe_2O_3$, etc. It is preferable that the inorganic particle to be coated be different in kind from a coating material The inorganic particle to be coated preferably has a particle size of not greater than about 1 $\mu$m and particularly not greater than 0.5 $\mu$m, and may have any form, such as an acicular form, a granular form, an amorphous form, and the like.

As described above, the inventors previously proposed to use $Cr_2O_3$ or $\alpha\text{-}Fe_2O_3$ as a material for coating the inorganic particles. In this connection, the inventors have elucidated that the localization of the inorganic particles in the surface portion is ascribable to the increased acidity of the inorganic particle surface by coating with $Cr_2O_3$ or $\alpha\text{-}Fe_2O_3$. That is, since a binder commonly employed in a magnetic layer has an acidic group, it is considered that the coated inorganic particles showing increased acidity on their surface, when dispersed in such a binder with the aid of an organic solvent, meet with, a repulse from the binder and are thereby localized on the surface of the magnetic layer applied. Accordingly, the material to be used for coating the inorganic particles is not limited to the above-recited $Cr_2O_3$ or $\alpha\text{-}Fe_2O_3$ but includes any of so-called solid acids which may increase acidity of the surface of the inorganic particles to thereby cause localization of the particles.

Specific examples of such a coating material include, in addition to $Cr_2O_3$ or $\alpha\text{-}Fe_2O_3$, simple oxides, e.g., $B_2O_3$, $ZnO$, $TiO_2$, $CeO_2$, $V_2O_5$, etc.; composite oxides, e.g., $TiO_2\text{-}CuO$, $TiO_2\text{-}MgO$, $TiO_2\text{-}ZnO$, $TiO_2\text{-}CdO$, $TiO_2\text{-}Al_2O_3$, $TiO_2\text{-}ZrO_2$, $TiO_2\text{-}PbO$, $TiO_2\text{-}Bi_2O_3$, $TiO_2\text{-}Fe_2O_3$, $ZnO\text{-}MgO$, $ZnO\text{-}Al_2O_3$, $ZnO\text{-}ZrO_2$, $ZnO\text{-}PbO$, $ZnO\text{-}Sb_2O_3$, $ZnO\text{-}Bi_2O_3$, $Al_2O_3\text{-}MgO$, $Al_2O_3\text{-}B_2O_3$, $Al_2O_3\text{-}ZrO_2$, etc.

In cases where the inorganic particle to be coated is an oxide, it may be reacted with the oxide coating material to form the above-enumerated composite oxide on its surface.

In addition, sulfates, phosphates, sulfides, chlorides, etc. of various metals can also be used as coating materials as long as they increase acidity of the particle surface to cause surface localization without adversely affecting the ferromagnetic fine powder, binder, and any other additives.

For reference, Japanese Patent Application (OPI) No. 159236/83 (the term "OPI" means "unexamined published Japanese patent application) discloses a technique of coating particles with $SiO_2$ similarly to the present invention. However, what is intended here lies in compatibility of smoothness of the surface of a magnetic layer with abrasion resistance of the same, which is believed to be accomplished by improvement on dispersibility of the particles in a binder, and, therefore, entirely differs from the present invention in concept. When this technique was applied to the present invention, the inorganic particles were not localized in the surface portion, though an increase in acidity was observed. This is assumed to be due to interaction between the silanol group on the surface of $SiO_2$ and the binder.

In the present invention, the coverage of the coating material ranges generally from 0.1 to 20 atom % and preferably from 0.1 to 10 atom %, based on the inorganic particles to be coated.

Coating of the inorganic particles having a Mohs' hardness of 5 or more with the above-recited coating material can be carried out by various methods selected depending on the kinds of these two matreials.

For example, particles coated with $Cr_2O_3$ can be obtained by (i) a method comprising dipping particles to be coated in an aqueous solution of a chromic acid salt, e.g., $(NH_4)_2Cr_2O_7$, $K_2Cr_2O_7$, or $Na_2Cr_2O_7$ and, after drying, pyrolyzing the coated particles at a temperature of from 300° to 800° C. for a period of from 15 minutes to 6 hours, (ii) a method comprising dispersing the particles to be coated in the same chromate aqueous solution, adjusting the solution to a pH in an acidic side to deposite $Cr(OH)_3$ on the surface of the particles, and pyrolyzing the particles at 300° to 800° C. for 15 minutes to 6 hours, or (iii) a method comprising dipping the particles in the same chromate aqueous solution, and reducing the coating in the presence of $O_2$, glycerin, and starch, followed by pyrolysis. When the chromate aqueous solution is used, a chromate may be dissolved in water by agitating in a mortar to prepare a saturated aqueous solution.

Particles coated with $\alpha\text{-}Fe_2O_3$ can be obtained by a method comprising dipping particles to be coated in a saturated aqueous solution of an iron salt, e.g., $FeSO_4$, $Fe_2(SO_4)_3$, $FeCl_2$, $FeCl_3$, $Fe(NO_3)_2$, $Fe(NO_3)_3$, etc., drying, and pyrolyzing at 400° to 1000° C. for 15 minutes to 6 hours. For example, alumina particles and a saturated $FeSO_4$ aqueous solution are stirred in an automated mortar mixer for 1 hour to thoroughly impregnate the aqueous solution into the alumina particles, and the impregnated particles are dried for half a day or one day. The dried particles are then ground in a coffee mill for 10 minutes, followed by calcination at 1000° C. for 1 hour. The calcined product is washed with water for 1 to 2 days to remove any impurity ions, dried for half a day, and further ground in a coffee mill for 10 minutes to obtain a desired particle size.

Particles coated with $\alpha\text{-}Fe_2O_3$ can also be obtained by depositing $Fe(OH)_3$ on the particles to be coated, followed by pyrolysis at 400° to 1000° C. for 15 minutes to 6 hours, or vaporizing $FeCl_3$ by heating to deposite $FeCl_3$ on the particles and applying steam thereto.

Particles coated with $B_2O_3$ can be prepared by, for example, dispersing particles to be coated in an aqueous solution of $B_2O_3$, evaporating the dispersion to dryness, and heating the coated particles at about 400° C. for 1 hour.

Particles coated with $ZnO$ can be prepared by, for example, dispersing the particles to be coated in an aqueous solution of zinc oxalate, evaporating the dispersion to dryness, and heating at about 400° C. for about 1 hour.

Coating with $CeO_2$ can be effected by the abovedescribed methods using, for example, a cerium acetate aqueous solution.

Coating with $ZnO\text{-}ZrO_2$ can be carried out by the above-described methods using, for example, a mixed aqueous solution of zinc oxalate and zirconium acetate at an arbitrary mixing ratio.

Coating of particles with other materials can also be effected in accordance with the above-described methods.

The non-magnetic support which can be used in the present invention is not particularly limited and may be any of commonly employed supports. Examples of usable supports include films made of synthetic resins, e.g., polyethylene terephthalate (PET), polypropylene, polycarbonate, polyethylene naphthalate, polyamide, polyamide-imide, polyimide, etc., and metal - foils, e.g., aluminum foil, stainless steel foil, etc. The thickness of the non-magnetic support is not particularly limited and usually ranges from 3 to 50 μm, and preferably from 5 to 30 μm.

The non-magnetic support may further has a backing layer on the side opposite to a magnetic layer.

The magnetic recording medium according to the present invention comprises the above-enumerated non-magnetic support having provided thereon a magnetic layer containing a ferromagnetic powder dispersed in a binder.

The ferromagnetic powders to be used in the present invention include well-known ferromagnetic particles such as $\gamma\text{-}Fe_2O_3$, Co-containing $\gamma\text{-}Fe_2O_3$, $Fe_3O_4$, Co-containing $Fe_2O_3$, $\gamma\text{-}FeOx$, Co-containing $\gamma\text{-}FeOx$ (x=1.33 to 1.50), $CrO_2$, Co-Ni-P alloy, Co-Ni-Fe-B alloy, Fe-Ni-Zn alloy, Ni-Co alloy, Co-Ni-Fe alloy, etc., as described in Japanese Patent Publication Nos. 14090/69, 18372/70, 22062/72, 22513/72, 28466/71, 38755/71, 4286/72, 12422/72, 17284/72, 18509/72, 18573/72, 10307/64 and 39639/73, and U.S. Pat. Nos. 3,026,215, 3,031,341, 3,100,194, 3,242,005 and 3,389,014. These ferromagnetic powders generally have a particle size of from about 0.01 to 1 μm, a ratio of average length in the long axis to average length in the short axis of from about 1/1 to 50/1 and a specific surface area of from about 1 to 150 m²/g. Further, dispersing agents, lubricating agents, antistatic agents, etc., as described below may be impregnated in a solvent and adsorbed on these ferromagnetic powders for each purpose before dispersion.

As ferromagnetic powders to be used in the present invention, barium ferrite having a hexagonal crystallized tabular shape can also be used. The barium ferrite have a particle diameter of from 0.001 to 1 μm, a ratio of a thickness to a diameter of from 1/2 to 1/20, a specific gravity of from 4 to 6 g/ml and a specific surface area of from 1 to 150 m²/g. And further dispersing agents, lubricating agents, antistatic agents, etc., as described below may be impregnated in a solvent and adsorbed on the barium ferrite for each purpose, before dispersion.

The ferromagnetic powder to be used in the magnetic layer include ferromagnetic alloy fine powders consisting mainly of iron, $\gamma$-$Fe_2O_3$, $Fe_3O_4$, Co-modified ferromagnetic iron oxide, $CrO_2$, as well as modified barium ferrite and modified strontium ferrite. The present invention is particularly effective in the cases of using ferromagnetic alloy fine powders containing iron, cobalt or nickel and having a specific surface area of 25 m²/g or more. Such ferromagnetic powders include those having a metal content of at least 75% by weight, with at least 80% by weight of the metal content being at least one kind of ferromagnetic metals or alloys, and up to 20% by weight of the metal content being other components. The aforesaid ferromagnetic metal content may contain a small amount of water, a hydroxide, or an oxide. Processes for producing these ferromagnetic metal powders are known in the art, and the ferromagnetic alloy powders, a typical example of the ferromagnetic powders to be used in the present invention, can also be produced according to these known processes.

When in using the ferromagnetic alloy powders, the shape of the powders is not particularly restricted and includes acicular, granular, cubic, ellipsoidal, and tabular shapes. The ferromagnetic alloy powders preferably have a specific surface area of not less than 42 m²/g, and more preferably not less than 45 m²/g, as determined by a BET method.

Binders to be used for formation of a magnetic layer include thermoplastic resins, thermosetting resins, and reactive resins as commonly employed in the art. These resins may be used either individually or in combinations thereof.

The thermoplastic resins to be used generally have an average molecular weight of from 10,000 to 200,000 and a degree of polymerization of from about 200 to about 2000. Examples of such thermoplastic resins include a vinyl chloride/vinyl acetate copolymer, a vinyl chloride/vinylidene chloride copolymer, an acrylic resin, a cellulose derivative, various synthetic rubber type thermoplastic resins, a urethane elastomer, polyvinyl fluoride, a polyamide resin, polyvinyl butyrate, a styrene/butadiene copolymer, a polystyrene resins, etc. These thermoplastic resins may also be used individually or in combinations thereof.

The thermosetting resins or reactive resins to be used generally include those having an average molecular weight of less than 200,000 in a state of a coating composition, with the molecular weight thereof increasing almost unlimitedly through condensation or addition reaction after coating. In the case of heatsetting resins, it is preferable that they are not cured or dissolved upon heating before setting. Such resins include a phenol/formalin novolak resin, a phenol/formalin resol resin, a phenol/furfural resin, a xylene/formaldehyde resin, a urea resin, a melamin resin, a drying oil alkyd resin, a phenol-modified alkyd resin, a maleic acid-modified alkyd resin, an unsaturated polyester resin, a combinatoin of an epoxy resin and a hardener, an isocyanate-terminated polyether moisture-curing resin, a polyisocyanate prepolymer, a combination of a polyisocyanate prepolymer and a resin having active hydrogen, and the like, either alone or in combination thereof.

Further, binders to be used for a magnetic layer may be hydrophilic group containing resins. For example, Examples of the hydrophilic group containing resins include a polyurethane resin having a $-COOR^1$ group or a $-SO_3R^1$ group (wherein $R^1$ represents a hydrogen atom, or an alkali metal such as Li, Na, or K), a vinyl chloride type resin having a $-SO_3R'$ group, a $-COOR'$ group, a $-OSO_3R'$ group or a

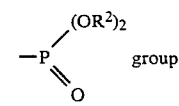

(wherein $R^1$ is the same as defined above and $R^2$ represents a hydrogen atom, an alkali metal such as Li, Na or K, or a hydrocarbon group), or a polyester resin having a $-SO_3R^1$ group (wherein $R^1$ is the same as defined above). These resins having the above function groups are described in Japanese Patent Application (OPI) Nos. 8127/84, 92422/82, 92423/82 and 40320/84.

The specific examples of hydrophilic groups containing resins include a —COOH group containing polyurethane ("TIM-3005", a trade name, manufactured by SANYO CHEMICAL INDUSTRIES, LTD.), a —SO₃Na group containing polyurethane ("UR-8300", a trade name, manufactured by TOYOBO CO., LTD.), a —COOH group containing vinyl chloride and vinyl acetate copolymer ("400×110A", manufactured by Nippon Zeon Co., Ltd.), a —SO₃Na containing polyester ("Byron 530", a trade name, manufactured by TOYOBO CO., LTD.), and a —SO₃Na containing vinyl chloride and vinyl acetate copolymer ("MR-110", a trade name, manufactured by Nippon Zeon Co., Ltd.). The content of a hydrophilic group is preferably from 1 to 10,000 equivalent/$10^6$ gr and the molecular weight thereof is preferably from 10,000 to 200,000.

The binder is used in an amount ranging from 10 to 100 parts by weight, and preferably from 15 to 50 parts by weight, per 100 parts by weight of the ferromagnetic powder.

The abrasive comprising the coated inorganic particles according to the present invention is incorporated into a magnetic layer in an amount of generally from 0.1 to 20% by weight, and preferably from 0.2 to 10% by weight, based on the ferromagnetic powder.

The magnetic recording medium according to the present invention may further contain commonly employed granular additives, such as an antistatic agent, e.g., carbon black having a mean particle size of from 0.015 to 0.2 μm, within such a range that gives rise to no bar to achievement of the purpose of the present invention.

The magnetic layer of the magnetic recording medium of the present invention can be formed by kneading the coated inorganic particles, ferromagnetic powders, such as a ferromagnetic alloy powder, a binder, and if desired, other granular fillers, together with a solvent to prepare a magnetic coating composition, coating the composition on a support, subjecting the coating to orientation in a magnetic field, and drying.

The solvent to be used for kneading may be any of those generally employed for the preparation of a magnetic coating composition.

The methods for mixing and kneading are not particularly limited, and the order of adding each ingredient can be optionally selected. Upon preparing a magnetic coating composition, a conventionally used mixing and kneading machine can be used, such as a two-rod roll mill, a three-rod roll mill, a ball mill, a pebble mill, a Trommel, a sand grinder, Szegvari-attritor, a high speed impeller, a dispersing machine, a high speed stone mill, a high speed impact mill, a Disper, a kneader, a high speed mixer, a ribbon blender, a cokneader, an intensive mixer, a tumbler, a blender, a disperser, a homogenizer, a single axial screw extruding machine, a biaxial screw extruding machine, or an ultrasonic dispersing machine. An example of a technique for mixing, kneading, and dispersing is disclosed in detail in T. C. Patton, *Paint Flow and Pigment Dispersion,* John Wiley & Sons (1964), Shinichi Tanaka, *Kogyo Zairyo (Industrial Materials),* Vol. 25, p. 37 (1977), and U.S. Pat. Nos. 2,581,414 and 2,855,156. In the present invention, a magnetic coating composition can be prepared by mixing, kneading and dispersing in accordance with the method as disclosed in the above disclosures.

Various techniques are known for the preparation of a magnetic coating composition, and the magnetic recording medium of the present invention can be produced utilizing any of these known techniques.

In carrying out the preparation of the magnetic coating composition, known additives, such as dispersing agents, antistatics agents, lubricants, and the like, may be used in combination.

Examples of the dispersing agent include fatty acids having from 12 to 18 carbon atoms, metallic soaps composed of these fatty acids and alkali metals or alkaline earth metals, esters of these fatty acids whose hydrogen atoms may be partly or wholly substituted with a fluorine atom, amides of these fatty acids, fatty acid amines, higher alcohols, polyalkylene oxide alkylphosphates, alkylphosphates, alkylborates, sarcosinates, alkyl ether esters, trialkylpolyolefin oxide quaternary ammonium salts, lecithin, etc. These dispersing agents are usually used in an amount of from 0.5 to 2.0 parts by weight per 100 parts by weight of the binder.

Examples of the antistatic agents include surface active agents, such as natural surface active agents, nonionic surface active agents, cationic surface active agents, anionic surface active agents containing an acid group, e.g., a carboxyl group, a sulfo group, a phospho group, a sulfate group, a phosphate group, etc., and amphoteric surface active agents, e.g., amino acids, aminosulfonic acids, sulfates or phosphates of amino alcohols; as well as conductive fine particles, such as carbon black. The amount of the antistatic agent to be added usually ranges from 0.1 to 10 parts by weight in the case of the surface active agent, or from 0.2 to 20 parts by wight in the case of the conductive powders, per 100 parts by weight of the binder.

Examples of the lubricants include the abovedescribed fatty acids, higher alcohols, fatty acid esters obtained from monobasic fatty acids having from 12 to 20 carbon atoms and mono- or polyhydric alcohols having from 3 to 20 carbon atoms, e.g., butyl stearate, sorbitan oleate, etc., mineral oils, animal or vegetable oils, lower olefin polymers, lower α-olefin polymers, graphite fine powders, and other compounds known as lubricants for plastics. The amount of these lubricants can be selected according to known techniques.

In the foregoing description, the additives, such as dispersing agents, antistatic agents, lubricants, etc., have been described in classes divided according to their effects in a strict sense, but the effects produced by these additives are not confined to the particular effects respectively described. In other words, some dispersing agents, for instance, may serve as a lubricant or antistatic agent. Therefore, when an additive produces multiple effects, the amount to be added is preferably determined taking such effects into consideration.

The thus prepared magnetic coating composition is coated on the aforesaid non-magnetic support by a known coating means. The composition is usually applied directly onto the support, but an intermediate layer, such as an adhesive layer, may be provided therebetween.

The thickness of the magnetic layer is not particularly limited, and usually ranges from about 0.5 to 10 μm, and suitably from 1.5 to 7.0 μm, on a dry basis.

The magnetic layer coated on the non-magnetic support is usually subjected to orientation in a magnetic filed whereby the ferromagnetic powders in the magnetic layer are oriented, and then dried. If desired, the surface of the magnetic layer may be subjected to smoothening treatment. The resulting magnetic recording medium is then cut to a desired shape.

If desired, the magnetic recording medium according to the present invention may further comprise a backing layer as commonly employed in the art.

EXAMPLE

The present invention will now be illustrated in greater detail with reference to Examples and Comparative Examples, but it should be understood that the present invention is not construed to be limited thereto. In these examples, all the parts are by weight unless otherwise indicated.

The abrasives used in the examples were prepared as follows.

Preparation of Abrasive:

A hundred grams of α-Al$_2$O$_3$ having a particle size of 0.2 μm and a saturated aqueous solution containing (a) 1.25 g, (b) 6.25 g, or (c) 12.5 g of (NH$_4$)$_2$Cr$_2$O$_7$ were mixed in an automated mortar mixer, dried, heated at 400° C. for 2 hours, and pulverized in a pulverizer. The resulting particles were designated as Cr$_2$O$_3$-coated α-Al$_2$O$_3$ (a), (b), or (c), respectively.

A hundred grams of α-Al$_2$O$_3$ having a particle size of 0.06 μm were mixed with a saturated aqueous solution of 12.5 g of (NH$_4$)$_2$Cr$_2$O$_7$, and the mixture was treated in the same manner as described above. The resulting particles were designated as Cr$_2$O$_3$-coated α-Al$_2$O$_3$ (d).

A hundred grams of SiC having a particle size of 0.3 μm were mixed with a saturated aqueous solution containing 13.5 g of (NH$_4$)$_2$Cr$_2$O$_7$, and the mixture was treated in the same manner as described above.

A hundred grams of α-Al₂O₃ having a particle size of 0.2 μm and a saturated aqueous solution containing (a) 2.8 g, (b) 14.0 g, or (c) 28.0g of FeSO₄.7H₇O were mixed in an automated mortar mixer, dried, heated at 600° C. for 2 hours, and pulverized in a pulverizer. The resulting abrasive partricles were designate as α-Fe₂O₃-coated α-Al₂O₃ (a), (b), or (c), respectively.

A hundred grams of α-Al₂O₃ having a particle size of 0.06 μm and a saturated aqueous solution containing 28.0 g of FeSO₄.7H₂O were mixed, and the mixture was treated in the same manner as for α-Fe₂O₃coated α-Al₂O₃ (a) to (c). The resulting abrasive particles were designated as α-Fe₂O₃-coated α-Al₂O₃ (d).

A hundred grams of SiC having a particle size of 0.3 μm were mixed with a saturated aqueous solution containing 15.0 g of FeSO₄.7H₂O, and the mixture was treated in the same manner as for α-Fe₂O₃-coated α-Al₂O₃ (a) to (c).

EXAMPLE 1

A magnetic coating composition having the following formulation was prepared and coated on a 10 μm thick polyethylene terephthalate non-magnetic support to obtain a dry thickness of 3.0 μm.

Formulation of Magnetic Coating Composition:

| | |
|---|---|
| Ferromagnetic alloy powder (Fe—Ni alloy; Ni content: ca. 5 wt %; specific surface area (S-BET): 45 m²/g) | 100 parts |
| Vinyl chloride/vinyl acetate/maleic anhydride copolymer ("400X110A" produced by Nippon Geon Co., Ltd.) | 12 parts |
| Polyurethane resin ("N-2301" produced by Nippon Polyurethane Ind. Co., Ltd.) | 8 parts |
| Polyisocyanate ("Collonate L" produced by Nippon Polyurethane Ind. Co., Ltd.) | 12 parts |
| Carbon black (average particle size: 0.1 μm)- | 1 part |
| Methyl ethyl ketone | 300 parts |
| Cr₂O₃-Coated α-Al₂O₃ (a) | 10.0 parts |

The non-magnetic support having coated with the magnetic coating composition was subjected to magnetic orientation while the composition being undried, dried, and calendered. The resulting magnetic sheet was slit to a width of 8 mm to obtain a 8 mm-video tape.

EXAMPLE 2

A video tape was produced in the same manner as described in Example 1, except for replacing Cr₂O₃-coated α-Al₂O₃ (a) with 5.0 parts of Cr₂O₃-coated α-Al₂O₃ (b).

EXAMPLE 3

A video tape was produced in the same manner as in Example 1, except for replacing Cr₂O₃-coated α-Al₂O₃ (a) with 2.5 parts of Cr₂O₃-coated α-Al₂O₃ (c).

EXAMPLE 4

A video tape was produced in the same manner as in Example 1, except for replacing Cr₂O₃-coated α-Al₂O₃ (a) with 5.0 part of Cr₂O₃-coated SiC.

EXAMPLE 5

A video tape was produced in the same manner as in Example 1, except for replacing Cr₂O₃-coated α-Al₂O₃ (a) with 0.5 part of Cr₂O₃-coated α-Al₂O₃ (c).

EXAMPLE 6

A video tape was produced in the same manner as in Example 1, except for replacing Cr₂O₃-coated α-Al₂O₃ (a) with 2.5 parts of Cr₂O₃-coated α-Al₂O₃ (d).

EXAMPLE 7

A video tape was produced in the same manner as in Example 1, except for replacing Cr₂O₃-coated α-Al₂O₃ with 10.0 parts of α-Fe₂O₃-coated α-Al₂O₃ (a).

EXAMPLE 8

A video tape was produced in the same manner as described in Example 7, except for replacing α-Fe₂O₃-coated α-Al₂O₃ (a) with 5.0 parts of α-Fe₂O₃-coated α-Al₂O₃ (b).

EXAMPLE 9

A video tape was produced in the same manner as described in Example 7, except for replacing α-Fe₂O₃-coated α-Al₂O₃ (a) with 2.5 parts of α-Fe₂O₃-coated α-Al₂O₃ (c).

EXAMPLE 10

A video tape was produced in the same manner as described in Example 7, except for replacing α-Fe₂O₃-coated α-Al₂O₃ (a) with 5.0 parts of α-Fe₂O₃-coated SiC.

EXAMPLE 11

A video tape was produced in the same manner as described in Example 7, except for replacing α-Fe₂O₃-coated α-Al₂O₃ (a) with 0.5 part of α-Fe₂O₃-coated α-Al₂O₃ (c).

EXAMPLE 12

A video tape was produced in the same manner as in Example 7, except for replacing α-Fe₂O₃-coated α-Al₂O₃ (a) with 2.5 parts of α-Fe₂O₃-coated α-Al₂O₃ (d).

COMPARATIVE EXAMPLE 1

A video tape was produced in the same manner as in Example 1, except for replacing Cr₂O₃-coated α-Al₂O₃ (a) with 5.0 parts of α-Al₂O₃ having a particle size of 0.2 μm. The resulting video tape was used as a standard in evaluation of recording performance as hereinafter described.

COMPARATIVE EXAMPLE 2

A video tape was produced in the same manner as in Example 1, except for replacing Cr₂O₃-coated α-Al₂O₃ (a) with 10.0 parts of α-Al₂O₃ having a particle size of 0.3 μm.

COMPARATIVE EXAMPLE 3

A video tape was produced in the same manner as in Example 1, except for replacing Cr₂O₃-coated α-Al₂O₃ (a) with 2.5 parts of α-Al₂O₃ having a particle size of 0.3 μm.

COMPARATIVE EXAMPLE 4

A video tape was produced in the same manner as in Example 1, except for replacing Cr₂O₃-coated α-Al₂O₃ with 0.5 part of SiC having a particle size of 0.4 μm.

COMPARATIVE EXAMPLE 5

A video tape was produced in the same manner as in Example 1, except for replacing Cr₂O₃-coated α-Al₂O₃

(a) with 5.0 parts of α-Al₂O₃ having a particle size of 0.06 μm.

Each of the video tapes obtained in Examples 1 to 12 and Comparative Examples 1 to 5 was evaluated for various properties according to the following test methods.

(1) Squareness Ratio (SQ):

A B-H curve (magnetization curve) of the video tape was determined by means of VSM (a vibratory flux meter manufactured by Toei Kogyo K.K.), and a squareness ratio, Br/Bm (ratio of residual magnetic flux density to maximum magnetic flux density), was obtained therefrom.

(2) Reproduction Performance:

The video tape was run on a video tape recorder ("FUJIX-8" manufactured by Fuji Photo Film Co., Ltd.), and signals of 5 MHz were recorded and reproduced. The reproduction output and reduction in output after 100 passes were measured. The video output was relatively expressed taking the reproduction output of 5 MHz of the video tape obtained in Comparative Example 1 as a standard (0 dB).

(3) C/N Ratio:

The C/N ratio was obtained by comparing the reproduction output when introducing a signal of 5 MHz with the noise when introducing a signal of 4 MHz taking the C/N ratio of Comparative Example 1 as a standard (0.0).

(4) Running Durability:

The video tape was repeatedly run on a video tape recorder (FUJIX-8), and the number of passes until the head gap bridging occurred was determined.

(5) Surface Gloss:

A total reflectance at incident and reflective angles of 45° was measured by means of a standard glossmeter ("AUD-CH-GV3", digital standard color-diffraction photometer produced by Suga Shikenki K.K.) and relatively expressed taking the specular gloss of glass having a refractive index of 1.56 at an incident angle of 45° (as measured according to JIS Z8741) as 100.

The results of these measurements are shown in Table 1 below.

EXAMPLES 13 TO 18

$Cr_2O_3$-Coated α-$Al_2O_3$ particles to be used in Example 13 were prepared in the same manner as for $Cr_2O_3$-coated α-$Al_2O_3$ (a) as used in Example 1. α-$Fe_2O_3$-Coated α-$Al_2O_3$ particles to be used in Example 14 were prepared in the same manner as for α-$Fe_2O_3$-coated α-$Al_2O_3$ (a) as used in Example 7. $B_2O_3$-Coated TiC particles to be used in Example 15 were prepared by dispersing TiC particles in an aqueous solution of $B_2O_3$, evaporating the dispersion to dryness, and heating the particles at 400° C. for 1 hour. ZnO-Coated TiC particles to be used in Example 16 were prepared by dispersing TiC particles in an aqueous solution of zinc oxalate, evaporating the dispersion to dryness, and heating the particles at 400° C. for about 1 hour. $CeO_2$-Coated SiC particles to be used in Example 17 were prepared by dispersing SiC particles in an aqueous solution of cerium acetate, evaporating the dispersion to dryness, and heating the particles at 400° C. for 1 hour. ZnO-$ZrO_2$-Coated SiC particles to be used in Example 18 were prepared by dispersing SiC particles in a mixed aqueous solution of zinc oxalate and zirconium acetate, evaporating the dispersion to dryness, and heating the particles at 400° C. The particle size of the particles to be coated and the coverage of the coating oxide are shown in Table 2 below.

A video tape was produced using each of the resulting inorganic coated particles as an abrasive in the amount indicated in Table 2 in the same manner as in Example 1.

Each of the resulting video tapes was evaluated in the same manner as in Example 1, and the results obtained are shown in Table 2. Further, in order to demonstrate that the surface acidity of the abrasive particles is increased by coating with the oxide coating material and that the coated particles having the thus increased surface acidity, when dispersed in a magnetic layer, are localized in the vicinity of the surface of the magnetic layer, each of the above-described coated particles was determined for acidity, basicity, and distribution in the

TABLE 1

| Example No. | Coated Inorganic Particles ||||| Br (G) | SQ | Gloss (%) | Video Output (dB) | C/N (dB) | Reduction in Output After 100 Passes | Number of Passes before Head Gap Bridging |
|---|---|---|---|---|---|---|---|---|---|---|---|---|
| | Particles to be Coated || Coating Material || Amount Added (part)** |||||||||
| | Kind | Size (μm) | Kind | Coverage (atom %)* | | | | | | | | |
| 1 | α-Al₂O₃ | 0.2 | Cr₂O₃ | 0.5 | 10.0 | 2720 | 0.80 | 99 | +0.1 | +1.1 | −0.8 | 200 or more |
| 2 | " | " | " | 2.5 | 5.0 | 2840 | 0.83 | 113 | +1.5 | +1.7 | −1.5 | 200 or more |
| 3 | " | " | " | 5 | 2.5 | 2820 | 0.83 | 111 | +1.3 | +1.5 | −1.3 | 200 or more |
| 4 | SiC | 0.3 | " | 5 | 5.0 | 2750 | 0.82 | 103 | +0.9 | +1.2 | −1.4 | 200 or more |
| 5 | α-Al₂O₃ | 0.2 | " | 5 | 0.5 | 2950 | 0.84 | 119 | +2.2 | +2.5 | −2.0 | 180 |
| 6 | " | 0.06 | " | 5 | 2.5 | 2900 | 0.84 | 117 | +1.7 | +2.0 | −1.0 | 200 or more |
| 7 | " | 0.2 | α-Fe₂O₃ | 0.5 | 10.0 | 2850 | 0.81 | 100 | +0.1 | +1.2 | −0.9 | 200 or more |
| 8 | " | " | " | 2.5 | 5.0 | 2860 | 0.83 | 115 | +1.6 | +1.6 | −1.4 | 200 or more |
| 9 | " | " | " | 5 | 2.5 | 2820 | 0.83 | 112 | +1.4 | +1.6 | −1.4 | 200 or more |
| 10 | SiC | 0.3 | " | 5 | 5.0 | 2840 | 0.82 | 105 | +1.1 | +1.3 | −1.3 | 200 or more |
| 11 | α-Al₂O₃ | 0.2 | " | 5 | 0.5 | 2930 | 0.84 | 116 | +2.1 | +2.4 | −1.9 | 190 |
| 12 | " | 0.06 | " | 5 | 2.5 | 2900 | 0.84 | 117 | +1.9 | +2.2 | −0.7 | 200 or more |
| Comparative | | | | | | | | | | | | |
| 1 | α-Al₂O₃ | 0.2 | — | — | 5.0 | 2720 | 0.80 | 100 | 0 | 0.0 | −5.0 | 120 |
| 2 | " | 0.3 | — | — | 10.0 | 2580 | 0.78 | 90 | −1.5 | −2.0 | −2.7 | 190 |
| 3 | " | " | — | — | 2.5 | 2620 | 0.78 | 92 | −1.2 | −1.6 | −3.8 | 130 |
| 4 | SiC | 0.4 | — | — | 5.0 | 2730 | 0.78 | 85 | −1.3 | −1.8 | −3.5 | 150 |
| 5 | α-Al₂O₃ | 0.06 | — | — | 5.0 | 2820 | 0.83 | 112 | +0.8 | +1.0 | −2.8 | 120 |

Note:
*Atom % of Cr or Fe based on the metal element of the particles to be coated.
**Part by weight per 100 parts by weight of the ferromagnetic powder.

magnetic layer according to the following methods. The results obtained are also shown in Table 2.

(1) Acidity:

The coated inorganic particles were poured into an isooctane solution of n-butylamine and stirred. The amount of n-butylamine adsorbed onto the particles was measured to obtain acidity of the particles.

(2) Basicity:

The coated inorganic particles were poured into an isooctane solution of benzoic acid and stirred. The amount of benzoic acid adsorbed onto the particles was measured to obtain basicity of the particles.

(3) Distribution of Coated Inorganic Particles in Magnetic Layer (Ratio of Proportion of Particles in Surface Portion to That in Whole Layer):

The magnetic layer was subjected to X-ray diffraction, and an integrated intensity ratio of a representative peak of the magnetic substance to a representative peak of the inorganic coated particles throughout the magnetic layer was determined. In the X-ray diffraction, since determination of an absolute value is attended by large errors, the intensity ratio was calculated based on a relative comparison with a standard (i.e., the magnetic substance).

Then, an integrated intensity ratio of a representative peak of the magnetic substance to a representative peak of the inorganic coated particles in the portion from the surface to the depth of about 0.5 μm of the magnetic layer was determined by the use of a thin layer X-ray diffraction apparatus (manufactured by Rigaku Denki K.K.).

The ratio of a proportion of the inorganic particles in the vicinity of the surface of the magnetic layer to that in the whole magnetic layer can be calculated from the above obtained intensity ratios.

That is, the ratio is shown below.

$$\text{Ratio} = \frac{\dfrac{\text{Integrated intensity of peak of Inorganic coated particles in the surface portion}}{\text{Integrated intensity of peak of Inorganic coated particles in the whole magnetic layer}}}{\dfrac{\text{Integrated intensity of peak of Magnetic substance in the surface portion}}{\text{Integrated intensity of peak of Magnetic substance in the whole magnetic layer}}}$$

(4) Wear of Head:

A degreee of wear of a head was measured after the video tape was run on a video tape recorder (FUJIX-8) at 23° C. and 70% RH for 100 hours.

TABLE 2

| Example No. | Particles to be Coated kind | Particles to be Coated Size (μm) | Coating Material Kind | Coating Material Coverage (atom %)* | Acidity/Basicity (μEg/g) | Amount Added (part)** | Distri- bution*** | Br (G) | SQ | Gloss (%) | Video Output (dB) | C/N (dB) | Head Wear (μm) | Reduction in Output After 100 Passes | Number of Passes before Head Gap Bridging |
|---|---|---|---|---|---|---|---|---|---|---|---|---|---|---|---|
| 13 | α-Al₂O₃ | 0.2 | Cr₂O₃ | 0.5 | 33/28 | 10.0 | 1.08 | 2780 | 0.82 | 107 | +0.5 | +1.0 | 1.7 | −0.9 | 200 or more |
| | " | " | " | 2 | 38/27 | 3.0 | 1.20 | 2800 | 0.83 | 111 | +1.2 | +1.3 | 1.0 | −1.5 | 200 or more |
| 14 | " | " | α-Fe₂O₃ | 3 | 45/39 | 4.0 | 1.24 | 2880 | 0.83 | 110 | +1.6 | +1.7 | 1.3 | −1.4 | 200 or more |
| | " | " | " | 8 | 60/41 | 2.0 | 1.34 | 2950 | 0.84 | 112 | +1.5 | +1.8 | 1.0 | −1.4 | 200 or more |
| 15 | TiC | 0.3 | B₂O₃ | 1 | 41/30 | 5.0 | 1.27 | 2920 | 0.83 | 112 | +1.2 | +1.7 | 1.6 | −1.0 | 200 or more |
| | " | " | " | 4 | 48/30 | 2.5 | 1.38 | 2960 | 0.84 | 110 | +1.3 | +1.8 | 1.1 | −1.3 | 200 or more |
| 16 | " | " | ZnO | 1.5 | 43/35 | 5.0 | 1.15 | 2880 | 0.83 | 114 | +1.0 | +1.1 | 1.2 | −.15 | 200 or more |
| | " | " | " | 3 | 48/36 | 2.5 | 1.22 | 2910 | 0.83 | 113 | +1.1 | +1.1 | 0.8 | −1.9 | 200 or more |
| 17 | SiC | 0.4 | CeO₂ | 0.3 | 36/29 | 5.0 | 1.10 | 2860 | 0.83 | 114 | +0.8 | +1.0 | 1.2 | −1.2 | 200 or more |
| | " | " | " | 1.2 | 41/26 | 2.5 | 1.18 | 2900 | 0.84 | 110 | +0.9 | +1.0 | 0.9 | −1.6 | 200 or more |
| 18 | " | " | ZnO—ZrO₂ (4/1) | 0.5 | 32/18 | 10.0 | 1.07 | 2840 | 0.83 | 106 | +0.4 | +0.7 | 1.8 | −0.8 | 200 or more |
| | " | " | ZrO—ZrO₂ (4/1) | 1 | 35/15 | 5.0 | 1.16 | 2900 | 0.83 | 110 | +0.7 | +1.0 | 1.0 | −1.5 | 200 or more |
| Comparative | | | | | | | | | | | | | | | |
| 1 | α-Al₂O₃ | 0.2 | — | — | 20/45 | 5.0 | 1.0 | 2720 | 0.80 | 100 | 0 | 0 | 0.9 | −5.0 | 120 |
| 2 | " | 0.3 | — | — | 13/32 | 10.0 | 1.0 | 2580 | 0.78 | 90 | −1.5 | −2.0 | 1.4 | −2.7 | 190 |

Note:
*The same as in Table 1.
**The same as in Table 1.
***Ratio of the proportion of the coated inorganic particles in the surface portion of the magnetic layer to that in the whole magnetic layer.

As is apparent from Tables 1 and 2, the magnetic recording medium according to the present invention exhibits excellent electromagnetic characteristics and running durability as compared with the conventional magnetic recording media and, thus, is suitable for practical use. More specifically, the magnetic recording media produced in Examples show superiority to those using uncoated $\alpha$-Al$_2$O$_3$ as prepared in Comparative Examples in Br, SQ, video output, and C/N ratio. Further, the magnetic recording media of Examples undergo less reduction in output after 100 passes and are less causative of the head gap bridging on repeated running, indicating superior running durability. It is of especial importance that the above-described excellent effects as well as the effect to minimize wear of the head can be produced by abrasive particles in an amount, based on the ferromagnetic powder, reduced to about half or even less of the amount used in the conventional magnetic recording media in view of comparison of Example 14 and comparative Example 1. Therefore, the magnetic recording media of the invention are very economical. Such reduction in amount of the abrasive means that the amount of the ferromagnetic powder in a magnetic layer may be so much increased to improve electromagnetic characteristics.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer comprising a binder having dispersed therein a ferromagnetic powder, in which said magnetic layer contains surface-coated inorganic particles having a Mohs' hardness of 5 or more as an abrasive, said coated inorganic particles being present substantially at the surface of the magnetic layer in a larger proportion than in the interior of the magnetic layer, the inorganic particles being coated with a material which increases the acidity of the surface of the inorganic particles; and wherein the binder is an acidic group containing resin.

2. A magnetic recording medium as claimed in claim 1, wherein said inorganic particles are selected from $\alpha$-Al$_2$O$_3$, TiC, SiC, SnO$_2$, SiO$_2$, TiO$_2$, ZrO$_2$, Cr$_2$O$_3$, and $\alpha$-Fe$_2$O$_3$.

3. A magnetic recording medium as claimed in claim 1, wherein said inorganic particles have a particle size of not more than about 1 $\mu$m.

4. A magnetic recording medium as claimed in claim 1, wherein said coating material is selected from Cr$_2$O$_3$, $\alpha$-Fe$_2$O$_3$, B$_2$O$_3$, ZnO, TiO, CeO$_2$, V$_2$O$_5$, TiO$_2$-CuO, TiO$_2$-MgO, TiO$_2$-ZnO, TiO$_2$-CdO, TiO$_2$-Al$_2$O$_3$, TiO$_2$-ZrO$_2$, TiO$_2$-PbO, TiO$_2$-Bi$_2$O$_3$, TiO$_2$-Fe$_2$O$_3$, ZnO-MgO, ZnO-Al$_2$O$_3$, ZnO-ZrO$_2$, ZnO-PbO, ZnO-Sb$_2$O$_3$, ZnO-Bi$_2$O$_3$, Al$_2$O$_3$-MgO, Al$_2$O$_3$-B$_2$O$_3$, Al$_2$O$_3$-ZrO$_2$, and a sulfate, phosphate, sulfide or chloride of a metal.

5. A magnetic recording medium as claimed in claim 1, wherein said coating material is coated in an amount of from 0.1 to 20% by weight based on the inorganic particles.

6. A magnetic recording medium as claimed in claim 1, wherein said coating material is coated in an amount of from 0.1 to 10 atom % based on the inorganic particles.

7. A magnetic recording medium as claimed in claim 1, wherein said ferromagnetic powder is a ferromagnetic alloy powder having a specific surface area of 42 m$^2$/g or more as measured by a BET method.

8. A magnetic recording medium as claimed in claim 1, wherein said coated inorganic particles are present in an amount of from 0.1 to 20% by weight based on the ferromagnetic powder.

9. A magnetic recording medium as claimed in claim 1, wherein said coated inorganic particles are present in an amount of from 0.2 to 10% by weight based on the ferromagnetic powder.

10. A magnetic recording medium as claimed in claim 1, wherein said coating material is coated in an amount of 0.1 to 20% by weight based on the inorganic particles and said coated inorganic particles are present in an amount of 0.1 to 20% by weight based on the ferromagnetic powder.

* * * * *